Feb. 12, 1952 — R. W. TRYON — 2,585,878
SKIMMING APPARATUS
Filed Jan. 26, 1949

Richard W. Tryon Inventor
By W. O. Heilman Attorney

Richard W. Tryon, Inventor
By W. O. Hilman, Attorney

Patented Feb. 12, 1952

2,585,878

UNITED STATES PATENT OFFICE 2,585,878

SKIMMING APPARATUS

Richard W. Tryon, Westfield, N. J., assignor to Standard Oil Development Company, a corporation of Delaware Application January 26, 1949, Serial No. 72,941

2 Claims. (Cl. 210—51)

The present invention relates to an apparatus for recovering the lighter of two substantially immiscible liquids of different specific gravities from a dispersion of the lighter liquid in the heavier or from an emulsion in which the lighter liquid is present in a minor proportion. More particularly, the invention relates to the recovery of a lighter liquid separated from a heavier liquid by gravity separation, and normally existing as a surface layer floating above a body of the heavier liquid, or dispersion or emulsion of such liquids, with an intervening interface. The invention is particularly concerned with an apparatus for recovering a thin film of a material such as oil separated from and floating on the surface of a material of higher specific gravity such as water.

In oil refinery operation, large volumes of waste water are derived from the various refinery equipment and processes. Naturally, this water contains quantities of oily materials which, if discharged without treatment, would produce contamination not only in any sewage treatment plant through which it might be passed, but also, if discharged into any natural body of water, navigable or otherwise, produces an undesirable pollution problem. While the quantity of oily materials is small in proportion to the volume of water with which associated, in the aggregate a considerable amount of more or less valuable oil products may be lost if provision is not made for separation prior to discharge. It is therefore conventional practice to pass refinery waste water through separating ponds or chambers in which the oily materials are separated by gravity. In order for such separation to be adequately accomplished, the ponds or chambers are usually comparatively shallow structures extended over a considerable area. Thus, the oily materials separated form comparatively thin films of such material on the surface of the ponds or chambers and offer extensive surface exposure to the sun and other atmospheric conditions, resulting in considerable evaporation loss. Also, due to the thinness of the surface film, difficulty is experienced in the recovery of such oily materials.

In most recovery operations, it is customary to divide a pond or chamber into a series of compartments by means of submerged weirs or baffles, thus attempting to concentrate the initial separation in one or two zones where the initially separated lower gravity material will be more or less confined and therefore form a thicker floating layer. Regardless of such expedients, however, the surface areas exposed still remain extensive, and losses, particularly by evaporation, are not substantially reduced. While various types of covered separating chambers have been devised in the past, among other disadvantages, these have been liable to explosion hazards by reason of confinement of volatile vapors.

It is an object of the present invention to provide means whereby the exposed surface of any given separation chamber may be reduced so as to minimize evaporation loss, and also, by concentration of the separated upper layer, to facilitate recovery thereof by more conventional means, such as by pumping. It is also an object of the invention to provide a method and means for recovering the lighter of two substantially immiscible liquids of different specific gravity from the surface of the heavier liquid, from which it has been separated by gravity separation, by positive displacement of the lighter liquid from an extended area of the surface of the heavier liquid to a substantially narrowly confined collection area upon such surface.

The invention and its objects may be more fully understood from the following description when read in conjunction with the accompanying drawings in which Figure 1 is a side elevational view, partly in vertical section, of one form of the invention;

Figure 1:
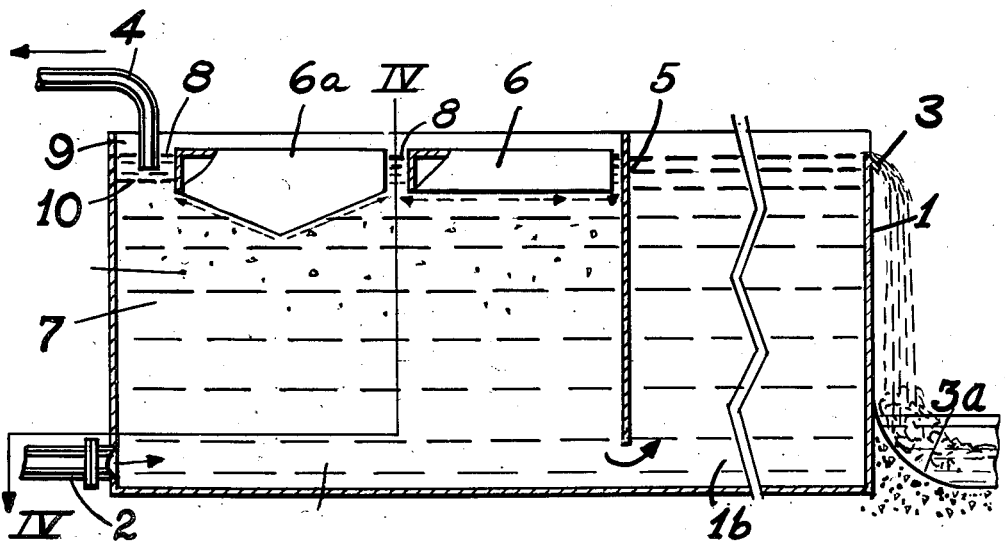

Referring more particularly to the drawings, in Figure 1 the numeral 1 designates a substantially conventional separation tank having an inlet 2 for a dispersion or emulsion of two substantially immiscible liquids, of different specific gravities, an outlet by way of overflow weir 3 for the heavier liquid, and an outlet, or pump suction line, 4 for the lighter liquid. The chamber or tank 1 is divided into two compartments 1a and 1b by means of a submerged weir or baffle member 5 extending downwardly from above the normal level of liquids in the tank into vertically spaced relation to the bottom thereof.

In a conventional operation, the primary separation of the two immiscible liquids would take place in the compartment 1a, and a major portion of the lighter liquid would form a thin film on the surface defined by the tank walls and the upper end of the baffle 5. The heavier liquid from which the lighter material had been substantially separated would then pass under the baffle 5 into the compartment 1b, from whence it would flow over weir 3 into any conventional conduit system such as the open flume 3a. The weir 3 is preferably adjustable for control of the liquid level in the chamber 1 as desired.

According to the present invention, it is proposed to provide displacement means such as floats 6 and/or 6a which not only reduce the surface area of the compartment 1a, and thereby reduce the surface area of the lighter liquid and its exposure to atmospheric conditions, but also thereby tend to increase the depth of a layer of lighter liquid separated from the main body of materials in the compartment, to facilitate removal thereof as through the suction line 4. In the drawing, the body of heavier liquid or the dispersion or emulsion of the two liquids is designated by the numeral 7, the lighter liquid layer is designated by the numeral 8, and droplets of such liquid separated and rising through the body of liquid 7 are indicated by the numeral 8a. As shown, the floats 6 and/or 6a are arranged in fairly closely spaced relation and are intended to be so disposed over substantially the entire surface of the liquids in the compartment 1a and floatable in the liquid or liquids 7. The spaces between floats or between the floats and the tank wall or baffle 5 are interconnected with one another, and also with a somewhat larger collection area 9, from which area the separated liquid is removed by the previously designated line 4.

As shown, the droplets of the lighter liquid form and rise upwardly in normal fashion. The floats 6 and/or 6a, however, act to displace these droplets into the substantially narrowly confined spaces as shown. It is not possible for the droplets of lighter liquid to form any considerable layer of such liquid below the under surface of the floats due to the difference in gravity between the lighter liquid and the liquid supporting the floats and the fact that, the floats being partially submerged, the bottom surfaces will be below the upper level of the heavier liquid at the interface 10. The directional movement of any portions of the lighter liquid which may come in contact with the bottom of the floats is indicated by dotted lines and arrows in Figure 1. If desired, although not essential, all or any of the floats may be provided with V-shaped bottom portions to accelerate flow of the lighter liquid upwardly into the confined spaces between the floats or between floats and the tank walls. In Fig. 1, the numeral 6a designates a V-bottom float member as distinguished from a flat-bottom float 6. The floats 6 and 6a may be formed as hollow members of any suitable metal such as steel or aluminum, or they may be of any highly buoyant wood. In either instance, it is preferable that they be coated, as by a plastic material, or a paint resistant to the corrosive effect of either of the two liquids or of the atmosphere. One example of such an expedient would be the use of balsa wood coated with a plastic material such as a vinyl resin. The size of the floats is variable according to the individual requirements, but ordinarily, they will be proportioned so as to facilitate placement and removal in order to permit cleaning of the separator pond or chamber in any conventional fashion.

Figure 2:
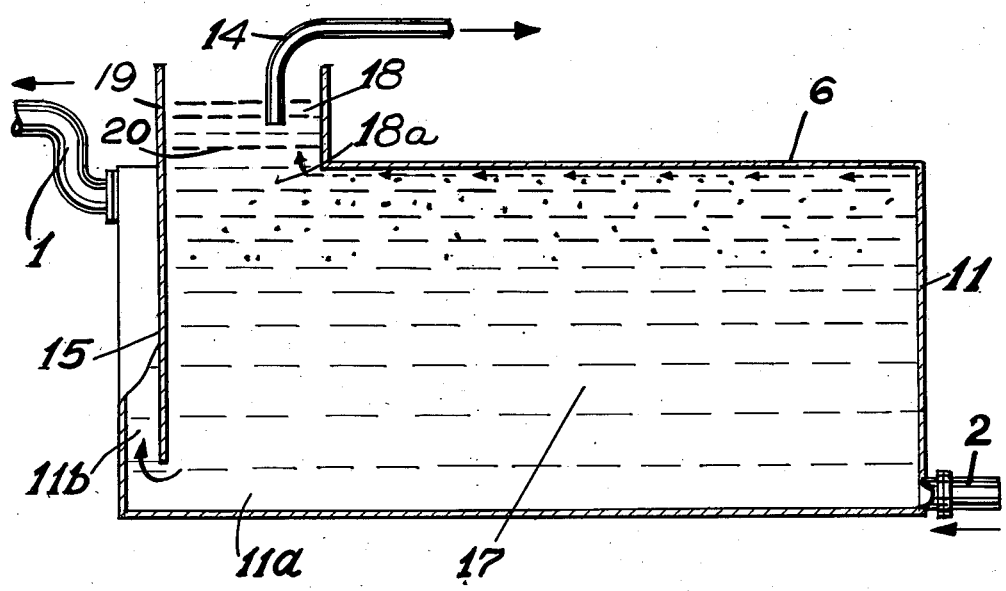
Figure 2 is a similar view of another form of the invention.

In the form of the apparatus illustrated by Figure 2, a separator tank 11 having an inlet line 12 and an outlet line 13 is provided with a fixed roof 16. A baffle 15 depends from substantially fluid-tight relation to the under surface of the roof, and to the opposite side wall portions of the tank, into vertically spaced relation to the bottom thereof, dividing the tank into a large separation compartment 11a and a compartment 11b through which the heavier component of the emulsion or dispersion is removed by way of the outlet line 13. Preferably, the line 13 should be provided with some form of vacuum breaker means to avoid siphoning of the liquid from tank 1. The numeral 17 designates the body of heavier liquid or the emulsion or dispersion contained in the tank. Opening through the roof 16 is a well 19 of which the side wall portions extend upwardly to a point above the level of the outlet line 13. The well 19 provides a collection zone for the lighter component 18 of the materials to be separated from whence they may be removed by means of suction line 14.

In operation of the apparatus illustrated by Figure 2, the materials to be separated are introduced to fill the tank 11 to such point that an interface 20 between the separated lighter liquid 18, and the heavier liquids in the tank is maintained in the well 19 above the level of the tank roof or cover 16. By this means, the lighter liquid separating from the emulsion or dispersion, as indicated by the droplets 18a, is maintained under a positive displacement pressure of the heavier liquid in the tank 11 and is forced to accumulate in the well 19. The movement of particles of the lighter liquid which come in contact with the under surface of the roof 16 is indicated by dotted lines and arrows. Although a thin film of the lighter liquid may form on the under surface of the roof 16 of Figure 2, or the floats 6 or 6a of Figure 1, and be maintained thereby surface tension, once this film is formed, the flow of separated lighter material into the collection areas will be maintained continuously by the positive displacement effect of the heavier liquids upon the lighter.

Figure 3:
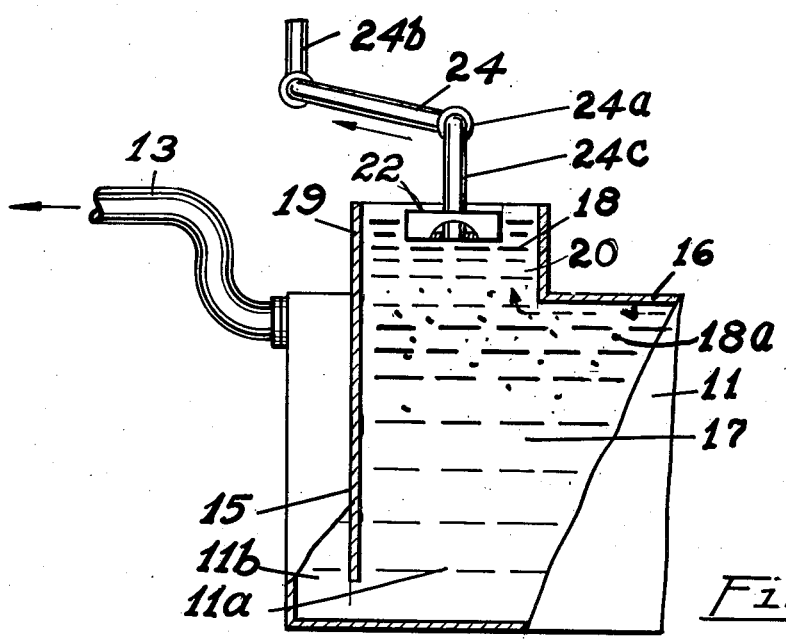
Figure 3 is a vertical section through a portion of an apparatus as shown in Figure 2, showing a floating collection means.

As shown in Figure 3, the means for withdrawing the lighter liquid from a collection area such as the well 19, may be arranged so as to maintain the inlet of such means constantly submerged in the body of lighter liquid 18 accumulated in the well. Such means may take the form of a conduit 24 provided with swivel joints 24a and 24b, in which the inlet portion 24c opens downwardly through and is supported by a float member 22. The float member 22 is provided for flotation in the lighter liquid 18a so as to maintain the lower end of the conduit means 24c below the level of lighter liquid in the well 19 at all times.

Figure 4:
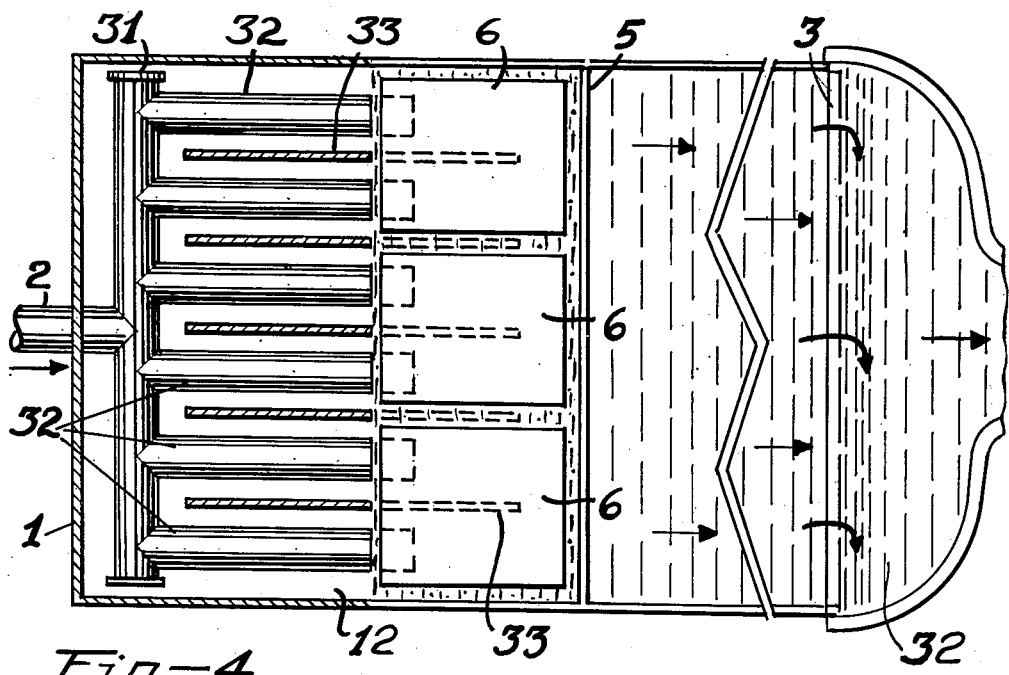
Figure 4 is a view, partly in horizontal section, and partly plan, as along the line IV—IV of Figure 1, showing means for distribution of materials fed into the separating chamber.

In the modified form of apparatus illustrated by Figure 4, means are provided for distributing and channeling flow through the separator compartment 1a. Any suitable means may be employed, as desired. As shown, such result is accomplished by connection of the inlet line 2 to a lateral distributor header 31 to which distributor branch lines 32 are connected at right angles, extending longitudinally of the compartment 1a. Preferably, both the header 31 and the branch lines 32 are provided with ports or slotted passageways opening downwardly therethrough into the chamber 1a below a horizontal plane through said elements, substantially coincident with their diameters in such plane. In addition, flow straightening devices such as vertical baffle members 33 may be provided. These may be used alone or in combination with elements 31 and 32. As shown, members 33 are disposed between the respective branch lines 32 extending upwardly from the bottom of the tank 1 to an intermediate upper level therein below the floats 6, or other form of cover for the compartment 1a, and longitudinally thereof from the approximate location of the lateral header 31 into spaced relation to the baffle 5. By such arrangement, possible turbulence within the compartment 1a may be substantially avoided, and separation of the lighter liquid accomplished in a series of parallel sub-compartments.

According to the apparatus described and illustrated, the narrowly defined collection zones or areas are of appreciable depth and an interfacial level between the separated lighter liquid and the body of liquids in the separation zone is maintained at an intermediate level in the collection zone either by the displacement effect of float members 6 and/or 6a or by maintaining a positive displacement pressure against the under surface of the cover 16. In any event, the interfacial level in the collection zone 8 or 18 will be above the under surface of either the cover 16 or the floats 6 and/or 6a. By regulated continuous withdrawal of the separated heavier liquid from below the interface and of the lighter liquid from above the interface in the collection zone, the interface in the well 19 may be maintained at a substantially constant level, and the end of pipe 4 kept submerged in the lighter liquid at all times. Substantially the same result may be obtained, of course, by means of a floating support for the suction end of the line 4, as illustrated in Figure 3. In the form of the apparatus illustrated by Figure 1, the interfacial level will be constant with respect to the floats 6 and/or 6a at all times. In this instance, however, in order to maintain constant withdrawal of separated lighter liquids from the apparatus, the withdrawal and introduction rates should be maintained fairly constant. In the apparatus as shown in Figure 1, this is accomplished by use of the overflow weir 3.

What is claimed is:

1. Apparatus for removing the liquid of lower specific gravity from a dispersion of said liquid in a liquid of higher specific gravity and substantially immiscible therewith, comprising a separator tank for gravity separation of said liquids, in which said liquids are separated to form an interface at an intermediate level therein, conduit means for supplying the dispersion of said liquids to the tank, a plurality of individual, self-buoyant float members arranged transversely of the tank in closely spaced relation to each other and the tank walls, said members floatable in the liquid of higher specific gravity so as to be partially submerged therein and to extend downwardly through and below an interface between the separated liquids, said float members defining between themselves and with the tank walls a plurality of intercommunicating narrowly defined collection areas for the separated lighter liquid, conduit means for withdrawing the lighter liquid from said narrowly defined collection areas, and separate outlet means for said liquid of higher specific gravity.

2. Apparatus according to claim 1, in which each float member is provided with an outwardly and upwardly inclined undersurface adapted to direct the separated lighter liquid toward a collection area adjacent peripheral edge portions of said member.

RICHARD W. TRYON.

REFERENCES CITED

The following references are of record in the file of this patent:

UNITED STATES PATENTS

| Number | Name | Date |
|---|---|---|
| 723,618 | Newton | Mar. 24, 1903 |
| 1,157,176 | Owen | Oct. 19, 1915 |
| 1,698,002 | Pink | Jan. 8, 1929 |
| 1,808,279 | Anderson | June 2, 1931 |
| 1,855,982 | Mohr | Apr. 26, 1932 |
| 2,287,975 | Collins et al. | June 30, 1942 |
| 2,330,508 | McColl | Sept. 28, 1943 |
| 2,462,368 | Donovan | Feb. 22, 1949 |